United States Patent [19]

Stichweh et al.

[11] Patent Number: 4,723,696
[45] Date of Patent: Feb. 9, 1988

[54] MOTOR VEHICLE ROOF RACK FASTENING ARRANGEMENT

[75] Inventors: Andreas Stichweh, Pulheim; Heinz Schwalm, Cologne, both of Fed. Rep. of Germany

[73] Assignee: Ford Motor Company, Dearborn, Mich.

[21] Appl. No.: 908,557

[22] Filed: Sep. 18, 1986

[30] Foreign Application Priority Data

Sep. 21, 1985 [DE] Fed. Rep. of Germany ....... 3533749

[51] Int. Cl.⁴ .............................................. B60R 9/00
[52] U.S. Cl. .................................... 224/331; 224/322; 296/213
[58] Field of Search ............... 224/331, 329, 309, 322, 224/326; 296/213, 37.7

[56] References Cited

U.S. PATENT DOCUMENTS

| 220,773 | 10/1879 | Stewart | 4/295 |
| 2,524,501 | 10/1950 | Wilhelm | 137/433 |
| 2,716,422 | 8/1955 | Whitlock, Jr. | 137/433 |
| 4,410,211 | 10/1983 | Kloppe et al. | 224/331 X |

FOREIGN PATENT DOCUMENTS

| 2931929 | 2/1981 | Fed. Rep. of Germany | 310/156 |
| 3151404 | 7/1983 | Fed. Rep. of Germany | 434/191 |
| 1429779 | 3/1976 | United Kingdom | 4/295 |

Primary Examiner—Henry J. Recla
Assistant Examiner—David Voorhees
Attorney, Agent, or Firm—Daniel M. Stock; Clifford L. Sadler

[57] ABSTRACT

In a roof rack fastening arrangement for motor vehicle bodies, having a longitudinal flat roof gutter which forms a covered drip molding and is covered by a decorative strip towards the outside and in which bracket shaped holding plates for the supporting feet of a roof rack are secured at specific positions, bracket shaped holding plates are provided on both sides of their central raised bracket portion with supporting flanges which are raised on one longitudinal side and on which the supporting feet of a roof rack rest and on the supporting feet Z-shaped clamping fittings are supported which can be tensioned by way of fastening screws and which are supported below their fastening screw on the supporting feet in such a way that they engage with their holding flanges under the raised bracket portion from the inside and by tightening the fastening screw they tension the supporting feet downwardly and outwardly.

5 Claims, 4 Drawing Figures

MOTOR VEHICLE ROOF RACK FASTENING ARRANGEMENT

BACKGROUND OF THE INVENTION

The present invention relates to the fastening of a roof rack on a motor vehicle body of the type having a flat roof gutter and a covered drip molding in which supporting feet of the roof rack are secured.

DESCRIPTION OF THE PRIOR ART

A roof rack fastening arrangement of this type is known from German Pat. No. 29 31 929. In this arrangement, bracket shaped holding plates are disposed at specific positions in longitudinal flat roof gutters and are covered on the outside by decorative strips. These are intended to receive the supporting feet of a roof rack and merely comprise flat insertion openings which lie parallel to the roof panel and into which outwardly angled tongue-shaped ends of the supporting feet of a roof rack can be laterally inserted from the inside towards the outside.

This known roof rack fastening arrangement has the disadvantage that the supporting feet of the roof rack must be arranged so as to be laterally displaceable outwards so as to allow the roof rack to be secured to the motor vehicle body. Such a displaceable arrangement of the supporting feet of a roof rack, however, is complicated and expensive.

A similar roof rack fastening arrangement is known from the German Pat. No. 31 51 404. In this arrangement, longitudinal holding rails which have an upwardly orientated web and a downwardly orientated flange are disposed in longitudinal flat roof gutters covered by decorative strips arranged at the outside. Supporting feet of the roof rack can be supported on clamping fittings of the roof rack can engage the rails.

This known roof rack fastening arrangement has the disadvantage that the tensioning of the clamping fittings which is customary in the assembly of roof racks cannot readily be applied by means of simple fastening screws.

SUMMARY OF THE INVENTION

The object of the present invention is to provide an improved roof rack fastening arrangement of the type in which the rack is supported in a flat, partly covered roof gutter in such a way as to permit a simple attachment of the roof rack with its supporting feet on the motor vehicle body and to further permit a simple tensioning of its clamping fittings by way of simple fastening screws.

This object is achieved in the present invention by providing a fastening arrangement having longitudinally extending holding plates received in the roof gutter which include a central, laterally inwardly opening raised bracket portion and upwardly extending supporting flanges on each longitudinal side of the raised bracket portion, and having Z-shaped clamping fittings which engage portions of the holding plates and the supporting feet of the roof racks so that a simple fastening screw arranged between the clamping fitting and the supporting feet can operate to tension or urge the feet downwardly and laterally outwardly with respect to the gutter.

This simple, direct attachment of the roof rack with its supporting feet on the motor vehicle body is made possible and a secure tensioning of the roof rack is ensured because of the following features of the fastening arrangement of the present invention: The bracket shaped holding plates are provided on both sides of their central raised bracket portion with supporting flanges which are raised on one longitudinal side and on which the supporting feet of a roof rack rest; Z-shaped clamping fittings are supported on the supporting feet and can be tensioned by way of a fastening screw; the clamping fittings are supported below their fastening screw on the supporting feet in such a way that they engage with their holding flanges under the raised bracket portion from the inside so that by tightening the fastening screw, the clamping fittings tension the supporting feet downwardly and outwardly.

BRIEF DESCRIPTION OF THE DRAWINGS

The invention is explained in greater detail with reference to an embodiment illustrated in the accompanying drawings, in which.

DESCRIPTION OF THE PREFERRED EMBODIMENT

Figure 1:
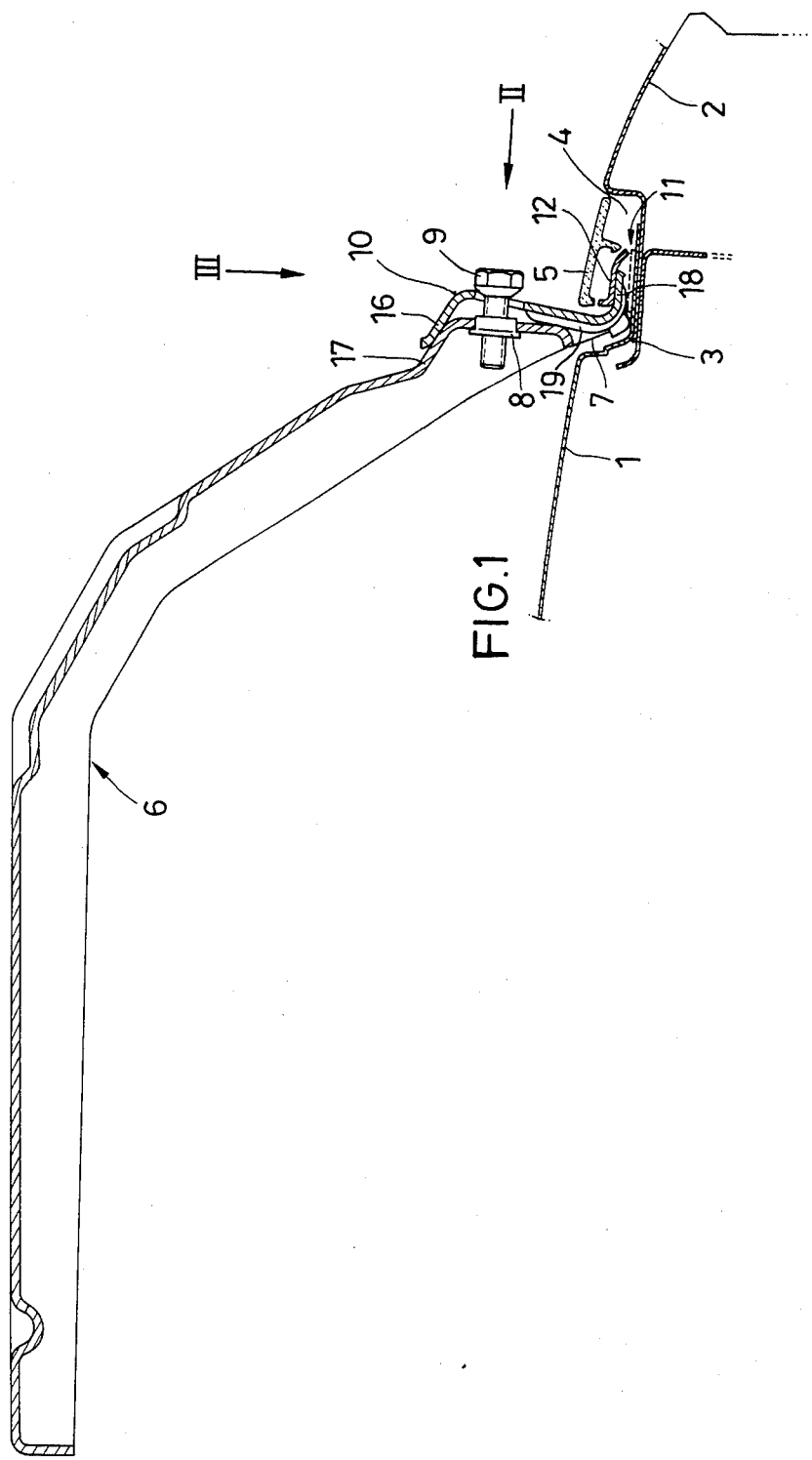
FIG. 1 is a vertical cross-section through a roof rack fastening arrangement along the center line of a roof rack supporting foot.
Figure 2:
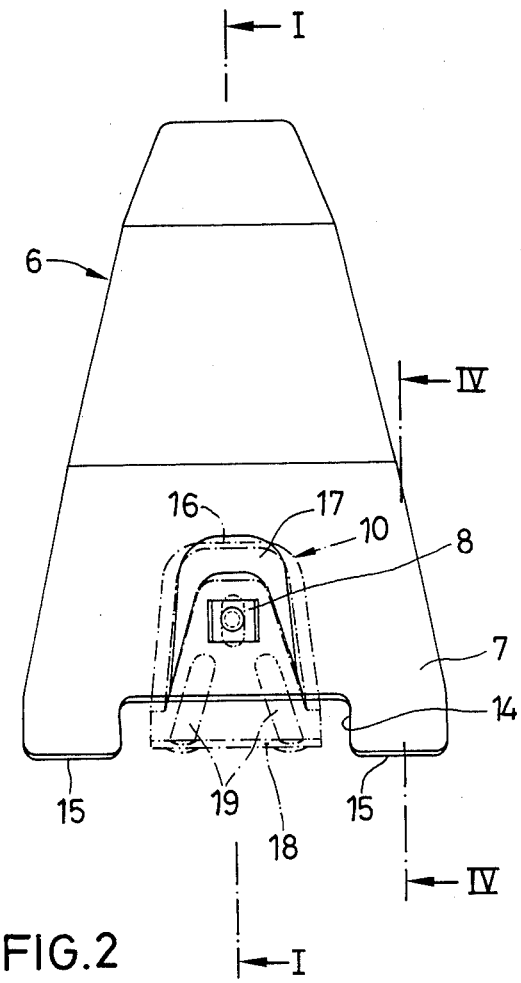
FIG. 2 is a side view of a roof rack supporting foot taken in the direction of arrows II—II in FIG. 1 with I—I indicating the section of FIG. 1.

As shown in FIG. 1, a motor vehicle roof panel 1 with its side wall panel 2 and a roof frame reinforcement panel 3 forms a sunk drip molding in the form of a longitudinal flat roof gutter 4 in which the spot welding connections of the body panels are also located. The longitudinal roof gutter 4 is at least partially covered by a decorative strip 5, which is secured in a known manner not shown in greater detail on clips provided in the roof gutter 4. Conventional supporting arm 6 of U-shaped cross-section for a roof rack or similar article carrier is provided at its lateral lower end with an enlarged supporting foot 7. In its central area it includes a fastening member 8 with a threaded bore for receiving a fastening screw 9 by means of which a Z-shaped clamping fitting 10 can be tensioned against the supporting foot 7.

Bracket shaped holding plates 11 are secured at specific positions in the flat roof gutter which extends longitudinally along the motor vehicle roof. The bracket plates 11 are secured at their lateral ends to the body panels by spot welding or the like and in their center they include a raised bracket portion 12 which is continued on one longitudinal side in lateral raised supporting flanges 13. Since the supporting foot 7 is reduced by a central cut-out portion 14 to front and rear supporting edges 15, these supporting edges 15 can rest on the raised supporting flanges 13 laterally towards the outside of the motor vehicle roof, and the Z-shaped clamping fittings, which are supported with their upper flange 16 on a corresponding surface 17 on the supporting foot 7, can engage, with their lower holding flanges 18 angled laterally outwards, under the central raised bracket portion 12 laterally outwards from the inside.

The Z-shaped clamping fittings 10 are supported below the fastening screw 9 by way of corrugations 19 which extend over the bend of the lower holding flange 18 and result in a reinforcement of the lower holding flange 18. The supporting edges 15 of the supporting foot 7 can, of course, be provided in conventional manner with shoes 20 of plastic material in order to prevent scratching of the painted surfaces.

Figure 3:
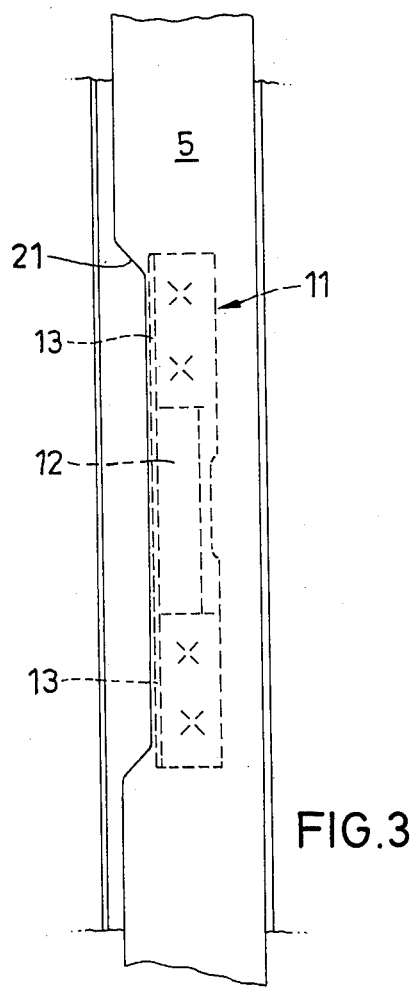
FIG. 3 is a plan view of the roof rack fastening arrangement taken in the direction of arrows III—III in FIG. 1 with the roof rack removed.
Figure 4:
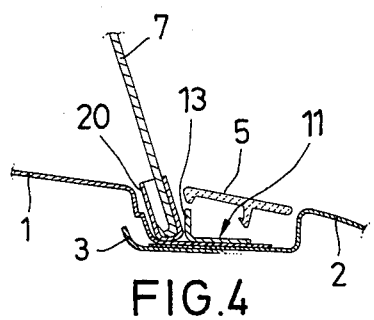
FIG. 4 is a section along lines IV—IV in FIG. 2.

The decorative strips 5 covering the longitudinal flat roof gutters 4 are, as shown in FIG. 3 provided with local cut-out portions 21 in order to facilitate the attachment of the supporting feet 7 of a roof rack directly from above.

The roof rack fastening arrangement according to the present invention has the advantage that a roof rack, as is customarily desired, can be attached with its supporting feet directly on the motor vehicle body from above, after which the insertion and screwing of the clamping fittings and the fastening screws can be carried out. Because of the relatively small cut-out portion in the decorative strips a favorable arrangement in terms of aerodynamics and styling is made possible.

What is claimed is:

1. A roof rack fastening arrangement for a motor vehicle body of the type having a longitudinal flat roof gutter which forms a drip molding covered by a decorative strip and in which bracket shaped holding plates for the supporting feet of a roof rack are secured at specific positions along the gutter, characterized in that the bracket shaped holding plates are provided on both sides of a central raised bracket portion with supporting flanges which are raised and extend longitudinally for engaging the supporting feet of the roof rack and that Z-shaped clamping fittings are supported on vertically shaped outwardly extending clamping surfaces of the supporting feet, the fittings being tensioned by means of a fastening screw positioned intermediate the clamping surfaces and being supported below the fastening screw on the supporting feet such that they engage with their holding flanges under the raised bracket portion from the inside and upon tightening of the fastening screw they tension the supporting feet downwardly and outwardly.

2. A roof rack fastening according to claim 1, characterized in that the Z-shaped clamping fittings are provided on their holding flanges with corrugations reinforcing a lower portion of the holding flanges.

3. A roof rack fastening according to claims 1 and 2, characterized in that the decorative strip covering the roof gutter is provided in the region of the bracket shaped holding plates with local cut-out portions.

4. An improved roof rack fastening assembly for a motor vehicle body of the type having a longitudinally extending roof gutter covered by a decorative strip and holding plates secured at fixed longitudinal positions along the gutter for supporting feet of a roof rack, the improvement comprising:

means defining a raised longitudinally central portion in the holding plates having a laterally inwardly facing opening;

generally Z-shaped clamping fittings being abuttingly engageable against vertically spaced, generally laterally extending upper and lower surfaces of the roof rack feet and having a portion insertable in the holding plate opening; and fastening screws insertable through the clamping fittings and having portions abuttingly engageable therewith at vertically spaced outwardly extending clamping surfaces thereof and being threadedly engageable with a vertically extending portion of the roof rack feet, whereby upon tightening actuation of the fastening screws, the roof rack supporting feet are urged downwardly by engagement of fittings with the clamping surfaces and laterally outwardly for securing in the roof gutter.

5. An improved roof rack fastening assembly as defined in claim 4 and further comprising means defining corrugations for reinforcing portions of abutting surfaces of the clamping fittings.

* * * * *